United States Patent [19]

Ito et al.

[11] 4,072,646
[45] Feb. 7, 1978

[54] CONJUGATED DIENE-MALEIC ACID DERIVATIVE COMPOSITIONS AND PROCESS FOR PREPARING THE SAME

[75] Inventors: Hiroyuki Ito; Hirosuke Imai, both of Yokohama, Japan

[73] Assignee: Nippon Oil Company Limited, Tokyo, Japan

[21] Appl. No.: 624,225

[22] Filed: Oct. 20, 1975

[30] Foreign Application Priority Data

Oct. 23, 1974 Japan .................................. 49-121522

[51] Int. Cl.$^2$ ............................ C08L 9/00; C08L 9/10
[52] U.S. Cl. ........................... 260/29.7 H; 260/29.7 N; 260/29.7 SQ
[58] Field of Search ..................... 260/29.7 H, 29.7 N, 260/29.7 SQ

[56] References Cited

U.S. PATENT DOCUMENTS 2,959,821  11/1960  Kolb .............................. 260/29.7 H
3,920,769  11/1975  Yaginuma et al. ............. 260/29.7 H

*Primary Examiner*—M. J. Welsh

[57] ABSTRACT

This invention relates to entirely novel compositions comprising

A. high-molecular anions from dissociation of a part or the whole of the carboxylic group of a conjugated diene-maleic acid derivative copolymer with repeating units represented by the formulae

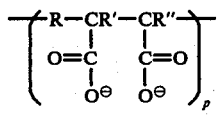 and 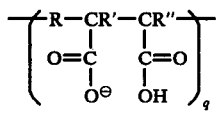

wherein R represents a conjugated diene unit in the copolymer, R' and R" each represent hydrogen or an organic radical having from 1 to 18 carbon atoms and $p$ and $q$ each are an integer;

B. one or more cations of alkali metal cations selected from the group consisting of Na$^+$, K$^+$ and Li$^+$ and quaternary ammonium cations represented by the formula R$_1$R$_2$N$^+$R$_3$R$_4$ wherein R$_1$, R$_2$, R$_3$ and R$_4$ each are selected from the group consisting of hydrogen, alkyl radical of from 1 to 18 carbon atoms, cycloalkyl radical and aryl radical;

C. Mg$^{2+}$;

D. anion of magnesium compound(s) or alkali metal compound(s) represented by X$^{n-}$ wherein $n$ is an integer 1 or 2; and E. water which are reversibly liquid at lower temperatures and solid at higher temperatures.

16 Claims, No Drawings

CONJUGATED DIENE-MALEIC ACID DERIVATIVE COMPOSITIONS AND PROCESS FOR PREPARING THE SAME

BACKGROUND OF THE INVENTION

1. Field of the Invention

The present invention is concerned with novel compositions which are reversibly liquid at lower temperatures or solid at higher temperatures and process for preparing the same.

2. Description of the Prior Art

There are known almost none of substances, as they are, in solution or in composition, that are reversibly liquid or in solution at lower temperatures and solvent-insoluble solid at higher temperatures. In the art are known a number of high-molecular substances called thermosetting resin, for most of which conversion from the non-cross-linked state to the cross-linked state is effected by heating. The change is irreversible and the cross-linked high-molecular substance will no longer be reversed to the original non-cross-linked state even with the heating removed or cooling. The same applies to the solution of a thermosetting resin; when a thermosetting resin is dissolved in a solvent such as water followed by heating, in the presence of a curing agent in some cases, there occurs a cross-linking reaction thereby forming cross-linked macromolecules, being swelled in most cases. They will no longer be reversed to the original solution state.

It would, therefore, permit a wide variety of uses in various industrial fields to provide a composition which is reversibly solid at higher temperatures and liquid at lower temperatures.

SUMMARY OF THE INVENTION

It is an object of this invention to provide novel compositions that are reversibly liquid at lower temperatures and in cross-linked solid at higher temperatures. Another object is to provide a process for preparing the same. Other objects will appear hereinafter.

The composition according to the invention comprises the following five components (A), (B), (C), (D) and (E).

DESCRIPTION OF THE INVENTION

The component (A) of the novel compositions according to the invention is high-molecular anions from dissociation of a part or the whole of the carboxylic group of a conjugated diene-maleic acid derivative copolymer with repeating units represented by the formulae

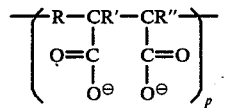   and   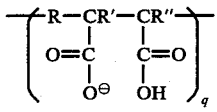

wherein R represents a conjugated diene unit in the copolymer, R' and R" each represent hydrogen or an organic radical having from 1 to 18 carbon atoms and $p$ and $q$ each are an integer. Degree of the dissociation in terms of the ratio of $p$ and $q$ is in the range from 100 : 0 to 0 : 100. The range from 100 : 0 to 50 : 50 is especially preferable. Conjugated dienes used for the preparation of the starting conjugated diene - maleic acid derivative are usually aliphatic or cyclic compounds of 4 – 20 carbon atoms with conjugated ethylenic double bonds including, for example, butadiene, isoprene, chloroprene, 2, 3-dimethylbutadiene, 2, 3-dichlorobutadiene, piperilene, 2-methyl- 1, 3-hexadiene and 1-methoxy- 1, 3-butadiene. Among them are preferred butadiene, isoprene, chloroprene and piperilene due to their each availabilities and low costs. These conjugated dienes are copolymerized with a maleic anhydride derivative by a known method to produce a conjugated diene - maleic anhydride derivative copolymer. The maleic anhydride derivative unit in the copolymer is converted to the maleic acid derivative unit by hydrolysis, which is further subjected to reaction with a base or bases to the carboxylic acid ion thereby forming the above-mentioned high-molecular ions. Alternatively, the hydrolysis and ionization are simultaneously effected by reacting the conjugated diene-maleic anhydride derivative copolymer with a base in water.

As the method for copolymerizing a conjugated diene and a maleic anhydride derivative are mentioned, for example, one using a radical-generating catalyst, polymerization under irradiation of ultraviolet ray or ionization radiant ray or one carried out in the presence of an organometallic catalyst. Copolymers obtained by any of the methods may be employed in the invention.

The conjugated diene-maleic anhydride derivative copolymer which is the starting material for the component (A), preferably, has an intrinsic viscosity at 30° C in various solvents in the range from 0.01 to 6.0, especially from 0.1 to 0.3.

The composition ratio of conjugated diene unit to maleic anhydride derivative unit or maleic acid derivative unit in the copolymers can be determined by NMR spectrum measurement, acid value measurement by means of potassium-hydroxide titration or others. In general, the conjugated diene-maleic acid derivative copolymer is a 1 : 1 alternate copolymer.

Alternatively, the above-mentioned high-molecular anions are obtained by polymerizing a maleic acid derivative in place of the maleic anhydride with a conjugated diene and then reacting the resultant conjugated diene-maleic acid derivative copolymer with a base or bases in water.

The component (B) is one or more of alkali metal cations consisting of $Na^+$, $K^+$ and $Li^+$ or quaternary ammonium cations represented by the formula $R_1R_2N^+R_3R_4$ wherein $R_1$, $R_2$, $R_3$ and $R_4$, being the same or different, each are selected from the group consisting of hydrogen, alkyl with from 1 to 18 carbon atoms, cycloalkyl and aryl. In the present invention, in which the reaction of the conjugated diene-maleic acid derivative copolymer with a base is carried out in water in order to afford the desired degree of dissociation in the component (A) macromolecules, the component (B) is incorporated as the counter cation for the high-molecular anion. The component (B) is essential for maintaining a predetermined degree of dissociation in the high-molecular anions. Amount of the component is preferably in the range from 0.5 to 5.0 equivalents, more preferably in the range from 0.8 to 2.0 equivalents on the basis of the maleic acid derivative unit in the component (A). As used herein, an equivalent is that one gram ion corresponds to one mole of the maleic acid unit independent upon the electric charge of the ion. In preparing the component (A) high-molecular anions with a predetermined degree of dissociation the aforementioned preferred range is achieved by employing a base or bases in an amount of one mole and preferably in the range from one mole to two moles per mole of the maleic acid derivative unit in the starting conjugated diene-maleic acid derivative copolymer depending upon the degree of dissociation and carrying out the reaction according to the process of the invention. So long as the desired degree of dissociation is maintained in the component (A) neutral compounds such as salts, for example, sodium chloride and sodium sulfate may be added to the composition for other purposes. However, in such a case in which, for example, Na+ is increased in the composition the total amount of the component (B) including the same should be in the range from 0.5 to 5.0 equivalents.

As the base used for the reaction between a conjugated diene-maleic acid derivative copolymer and a base or bases are mentioned alkali metal compounds including the hydroxides such as sodium hydroxide, potassium hydroxide and lithium hydroxide, the carbonates such as sodium carbonate, potassium carbonate and lithium carbonate and the bicarbonates such as sodium bicarbonate and potassium bicarbonate, and amines including ammonia, primary amines such as methylamine, ethylamine, n-propylamine, isopropylamine, n-butylamine, sec-butylamine, tert-butylamine, n-hexylamine, n-octylamine, laurylamine, cyclohexylamine, aniline and benzylamine, secondary amines such as dimethylamine, diethylamine, methylethylamine, dipropylamine, diisopropylamine, dibutylamine, diphenylamine, N-methylaniline, N-methylcyclohexylamine, pyrrolidine, piperidine and morpholine and tertiary amines such as trimethylamine, triethylamine, tri-n-propylamine, triisopropylamine, tri-n-butylamine, dimethylhexylamine, tri-n-octylamine, pyridine, dimethylaniline, N-methyl-pyrrolidine, N-methyl-piperidine and N-methylmorpheline. Any one of these or a combination of plural members of them may be used. Nature of the component (B) depends upon the nature of the bases or base employed and amount of the former roughly depends upon the total amount of the latter.

The component (C), the next member required for forming the composition according to the present invention, is magnesium ion $Mg^{2+}$. The $Mg^{2+}$ plays an important role in developing the characteristic of the novel compositions according to the invention that they are liquid at lower temperatures, becomes solid with increase in temperature and are liquefied again on cooling. The $Mg^{2+}$ employed in the invention is in the form of a water-soluble magnesium-containing compound, usually a magnesium salt. Although it is preferable to use a magnesium compound readily soluble in water because of readily providing $Mg^{2+}$ ions, a magnesium compound poorly soluble in water may also be employed even if it is present partly in undissolved solid provided that the dissolved portion provides a predetermined amount of $Mg^{2+}$ ions. As examples of the magnesium compound which may be employed are mentioned mineral acid magnesium salts such as magnesium chloride, magnesium permanganate and magnesium sulfate and organic acid magnesium salts having 1 - 18 carbon atoms such as magnesium acetate, magnesium propionate, magnesium formate and magnesium phthalate. A mixture of these compounds may also be used. A magnesium compound which is converted in situ to a water-soluble magnesium compound thereby providing $Mg^{2+}$ ion, of course, may be employed.

It is preferable to use $Mg^{2+}$ ions in an amount in the range from 0.5 to 2.0 equivalents on the basis of the maleic acid derivative unit in the conjugated diene-maleic acid derivative copolymer used as the starting material for the component (A), an amount in the range from 0.7 to 1.5 equivalents being more preferable. Although amount of the magnesium compound(s) used corresponds to the amount of $Mg^{2+}$ ions present in the composition in some cases, the latter does not correspond to the former sometimes depending upon the preparative process. Accordingly, the amount of $Mg^{2+}$ ions should be determined on the basis of $Mg^{2+}$ ions present in the composition.

Next, the component (D) is anions X-n wherein $n$ is an integer 1 or 2. Most of X-n are anions that will combine with $Mg^{2+}$ to form water-soluble magnesium compound(s) and are anions from the magnesium compound(s) used for the preparation of the composition according to the present invention after liberating $Mg^{2+}$. They are, for example, $Cl^-$, $Br^-$, $MnO_4^-$, $NO_3^-$, $ClO_4^-$, $CH_3COO^-$, $CH_3CH_2COO^-$ and $SO_4^{--}$. When alkali metal compounds such as the carbonates and bicarbonates are employed as the base in the reaction of a conjugated diene-maleic acid derivative copolymer and a base or bases $X^{n-}$ also includes anion from dissociation in water of $Na^+$, $K^+$ or $Li^+$, which are anions such as, for example, $HCO_3^-$. Accordingly, amount of the component (D) relates to the amount of $Mg^{2+}$ and, when the carbonates and/or the bicarbonates are used as the base, it is varied corresponding to the amount of $Na^+$, $K^+$ or $Li^+$. In addition, anion from the compounds added for other purposes such as, for example, sodium chloride may be included. Total amount of the $X^{n-}$ is in the range from 0.5 to 7.0 equivalents, preferably from 0.7 to 3.5 equivalents on the basis of the maleic acid derivative unit. There may be $OH^-$ ions.

Lastly, water is necessary for the composition as the component (E). The various ions in the composition are present in water at lower temperatures either independently one another or in weak interaction, the entire composition being liquid, whereas the interaction is enhanced with increase in temperature by heating to cross-linked state thereby forming a solid with water contained therein. When the solidified composition is cooled, it will again be liquid to recover fluidity. Amount of water is suitably from 1 to 1000 times, preferably from 2 to 500 times the total amount of the components (A), (B), (C) and (D). The amount in the composition is determined in accordance with viscosity in liquid state or strength in solid state required depending upon the object.

The composition when heated is solid being variable from jelly to rubber depending upon proportions of the components (A), (B), (C), (D) and (E).

In the compositions according to the present invention which comprises the above-mentioned five components, absence of any of the components will fail to produce a composition possessing the novel properties of the invention and lack of the relative amounts of the components under the specific conditions according to the invention also will fail to produce a composition according to the invention.

The process for preparing the compositions according to the invention will illustratively be described below. A conjugated diene-maleic acid derivative copolymer and a predetermined amount of an alkali metal compound, amine or a mixture of the two are blended in water and reacted with stirring at a temperature selected from temperatures from room temperature to boiling point of the water. pH of the aqueous alkali metal salt or amine salt solution of conjugated diene-maleic acid derivative copolymer in this reaction is in the range from 7 to 14, preferably from 7 to 12. When the pH is below 7, there will not be produced a composition possessing the novel properties even after addition of magnesium compound(s) in the below-described step.

After cooled, a predetermined amount of magnesium compound(s) is added to the resulting aqueous solution. When the magnesium compound(s) is used in an amount corresponding to 0.5 –0.8 equivalents of $Mg^{2+}$ on the basis of the maleic acid derivative unit, the resulting solution as it is will be a composition of the invention. The solution will be converted by heating to a temperature above about 80° C. to a jelly-like solid, which will be returned to the original liquid when cooled; there occurs reversible change of the state between liquid and solid.

When the magnesium compound(s) is added in an amount corresponding to 0.8–2.5 equivalents of $Mg^{2+}$ on the basis of the maleic acid unit, the solution after the addition becomes cloudy, which on standing undergoes liquid-liquid phase separation into a low-viscosity upper layer and a high-viscosity lower layer. The liquid lower layer is also a composition of the invention, which, when heated, will gradually be solid with increase in temperature from about 60° C, and become a high-strength solid with rubbery elasticity at a temperature of 80° C or higher, though the change is somewhat more or less depending upon the composition. When the solid is cooled, it will gradually be liquefied, finally to the original liquid before the heating. There also occurs reversible change of the state between liquid and solid. Atomic absorption spectrum analysis shows that the lower layer does not contain the whole amount of $Mg^{2+}$ ions formed from the magnesium compound(s) used, a portion of the $Mg^{2+}$ ions remaining in the upper layer from the two-layer separation.

When the entire solution with magnesium compound(s) in an amount corresponding to 0.8–2.5 equivalents of $Mg^{2+}$ on the basis of the maleic acid derivative unit added is heated with stirring immediately after the addition of magnesium compound(s) and without the two-layer separation by standing applied, a solid mass is precipitated in the solution. It is separated by filtration while hot and cooled to give a liquid, which, when heated, becomes a rubbery solid to exhibit reversible properties. Composition of the mass is the same as with the lower-layer solution obtained by the two-layer separation. The two compositions are identical.

If the composition that will be a rubbery solid if heated is diluted with water, strength of the solid after solidification by heating becomes lower finally to give a jelly-like solid. It is thus concluded that the compositions, one exhibiting jelly-like state and the other exhibiting rubber-like state when heated, are substantially identical and are both within the scope of the compositions according to the invention. This indicates that adjustment of the amount of $Mg^{2+}$ ions in the composition allows change of the properties of the solid obtained by heating which is one of the distinguished features of the invention.

When a composition is produced according to the process of the invention in which the amount of one or more components in the composition does not meet the conditions as specified in the invention, the composition will not, of course, be one possessing novel properties according to the invention. As set forth above, when pH of the aqueous alkali metal salt or amine salt solution of an intermediate conjugated diene-maleic acid derivative copolymer is below 7, there will hardly be produced a composition possessing the novel properties even if specified amount of magnesium compound(s) was added. However, addition to the composition of the deficient component in an amount sufficient for the resultant amount of the component to meet the requirement, the composition will be one according to the present invention. For example, if a composition is deficient in the amount of the component (B), namely, alkali metal cations or quaternary ammonium ions, addition to the composition of a required amount of the alkali metal compound or amine followed by sufficient stirring provide a composition according to the invention. As an alternative process for the preparation of a composition according to the invention is mentioned a process comprising feeding a conjugated diene-maleic acid derivative copolymer, a base or bases such as alkali metal compounds or amines, magnesium compound(s) and water in amounts sufficient to provide a predetermined composition into a reaction vessel at one time and heating the mixture with stirring.

In the preparative process according to the present invention it is desirable to carry out a series of procedures in an atmosphere of an inert gas such as nitrogen. However, the compositions of the invention can be also obtained if the reaction is carried out in air.

When the composition thus obtained is poured into a large amount of a hydrophilic solvent such as methanol or acetone and the precipitates thus formed are separated by filtration and dried in vacuo there is obtained a hard glass-like solid. Evaporation of the water directly from the composition gives a solid plate or film. These solids are convenient to handle in storage or transportation and can be converted to the desired composition when used by adding a predetermined amount of water and thoroughly stirring to a homogeneous liquid.

The compositions are liquid at temperatures below about 50° C., becomes solid from jelly to rubber at temperatures of 60° C. or higher, especially of 80° C. or higher and, when cooled, are returned to the original liquid state. They are novel substances with such reversibility and are expected to have a wide variety of uses. Especially they are useful as water-soluble adhesive, fire extinguishing agent, thickener, binder, coating agent, textile printing agent and the like.

DESCRIPTION OF PREFERRED EMBODIMENTS

The compositions of the invention will be described in greater detail in conjunction with the following examples.

EXAMPLE 1

15.4g. of a butadiene-maleic anhydride copolymer with an intrinsic viscosity of 0.65 (determined in acetone at 30° C.) and with a butadiene/maleic anhydride composition ratio of 51 : 49, 7.9g. of sodium hydroxide and 300 ml. of pure water were fed in a separable 500 ml. flask which was equipped with a reflux condenser and a stirrer and in which the air had been purged with nitrogen. Heating was then applied at 100° C. for 2 hours with stirring to give a colorless, transparent, viscous aqueous solution with a pH of 12. The aqueous solution was cooled to room temperature, to which was then added, little by little with stirring, a separately prepared aqueous solution of 14.3g. of magnesium chloride hexahydrate in 50 ml. of pure water. After completion of the addition, part of the aqueous solution was withdrawn into a test tube, which was heated for 2 minutes in an oil bath held at 100° C. to find that the aqueous solution was converted into an agar-like, white, soft solid. The test tube was taken out of the oil bath and then cooled with flowing water, resulting in that after 2 minutes the solid reverted to its original state of an aqueous solution. Such heating and cooling operations were repeated five times, and every time there was observed the same reversible change. The composition of the aqueous solution was as shown in Table 3.

EXAMPLE 2

An aqueous butadiene-maleic anhydride copolymer magnesium salt solution was prepared in the same way as in Example 1 except that the amount of magnesium chloride hexahydrate used was increased to 20.3g. Just before completion of the addition of the aqueous magnesium chloride the solution became opaque. This aqueous solution was transferred from the flask into a messcylinder and then left standing for two hours. As a result, it was separated into two layers. The upper layer was removed, and the remaining viscous, lower layer was partly transferred into a test tube, which was heated in an oil bath held at 100° C. to find that after 2 minutes the aqueous solution was converted into a white solid with a rubber-like elasticity and strength. The test tube was then cooled with flowing water, resulting in that the solid therein was gradually liquefied and after 3 minutes reverted to its original state of an aqueous solution. This reversible change occurred every time such heating and cooling operations were repeated. The composition of the aqueous solution was as shown in Table 3.

EXAMPLE 3

An aqueous copolymer sodium salt solution was prepared in the same way as in Example 1 except that 8.5g. of sodium carbonate was used in place of sodium hydroxide. The pH of the aqueous solution was about 9. To it was then added slowly at room temperature a separately prepared aqueous solution of 20.3g. of magnesium chloride hexahydrate in 50 ml. of pure water. After completion of the addition, the resulting aqueous solution was transferred into a messcylinder. As a result, it was separated into two layers. The lower layer was withdrawn and heated with the result that at a temperature of about 90° C. it was converted into a white, rubber-like solid, which on cooling reverted to its original state of an aqueous solution. The composition of the aqueous solution was as shown in Table 3.

EXAMPLE 4

An aqueous copolymer potassium salt solution was prepared in the same way as Example 1 except that 7.0g. of potassium hydroxide was used in place of sodium hydroxide and the amount of pure water used was 500 ml. The pH of the aqueous solution was about 7. To it was then added, little by little with stirring, an aqueous solution of 14.8g. of magnesium sulfate heptahydrate in 100cc of pure water. After completion of the addition, the aqueous solution was transferred into a messcylinder and left standing overnight. The two-layer separation did not occur, but when part of the aqueous solution was transferred into a test tube and heated in an oil bath at 100° C. it was converted into a soft, cross-linked solid. The test tube was then cooled with the result that the solid therein reverted to its original state of an aqueous solution. Repeated operations resulted in the same reversible phenomenon.

EXAMPLE 5

7.6g. of a butadiene-maleic anhydride copolymer with an intrinsic viscosity of 0.40 (determined in acetone at 30° C.) and with a butadiene/maleic anhydride composition ratio of 50 : 50, 6.0g. of sodium hydroxide and 200 ml. of pure water were fed in a 500 ml. Erlenmeyer flask, which was shaken on a shaker for 5 hours at room temperature to give a colorless, transparent, viscous aqueous solution. Then the pH of the aqueous solution was adjusted from about 14 (before adjustment) down to 8 using a 1N aqueous sulfuric acid solution. To the aqueous solution was then added at a time an aqueous solution of 14.8g. of magnesium sulfate heptahydrate in 50cc of pure water, followed by application of a violent stirring. The Erlenmeyer flask was left standing for 2 hours to allow the solution therein to be separated into two layers. After removal of the upper layer through decantation, the remaining lower layer on heating assumed a solid state and on cooling assumed a state of an aqueous solution. The transition between solid and liquid phases was reversible.

EXAMPLE 6

An aqueous butadiene-maleic anhydride copolymer magnesium salt solution was prepared in the same way as in Example 5 except that 8.4g. of sodium bicarbonate and 10.8g. of magnesium acetate tetrahydrate were used in place of sodium hydroxide and magnesium sulfate, respectively. The aqueous solution was poured in a large amount of acetone and the resulting precipitate was separated and dried. The resulting solid was dissolved in 100 ml. of pure water; and this aqueous solution was heated at 100° C. to give a rubber-like matter, which on cooling reverted to its original state of an aqueous solution.

EXAMPLE 7

An aqueous butadiene-maleic anhydride copolymer lithium salt solution was prepared in the same way as in Example 1 except that there were used 15.0g. of a butadiene-maleic anhydride copolymer with an intrinsic viscosity of 1.10 (determined in acetone at 30° C.) and with a butadiene/maleic anhydride composition ratio of 52 : 48, 7.7g. of lithium hydroxide monohydrate and 500 ml. of pure water. The pH of the aqueous solution was 11. To the aqueous solution was directly added 40g. of magnesium acetate tetrahydrate and a violent stirring was applied for 3 hours at room temperature. Stirring was discontinued and the aqueous solution was transferred into a messcylinder, which was left standing overnight to allow the solution to be separated into two layers. The lower layer was withdrawn; it assumed on heating a rubber-like solid state and on cooling assumed a state of an aqueous solution.

COMPARATIVE EXAMPLES 1 - 6

Experiments were conducted in the same way as in Example 1 but using the conditions set out in Table 1. None of the experiments, however, could produce a substance which on heating assumes a solid phase and on cooling is converted into an aqueous solution and which undergoes a reversible transition between solid and liquid phases. The cause was that in Comparative Example 1 to the $p : q$ ratio, in Comparative Examples 2–4 the use of metals other than magnesium and in Comparative Examples 5 and 6 the use of copolymers other than conjugated diene-maleic acid derivative copolymers, did not satisfy the production conditions of the present invention.

Table 1

| Comparative Example | Copolymer Kind | Copolymer Quantity (g) | N₂OH Quantity (g) | p : q * | Compounds Added Kind | Compounds Added Quantity (g) | Metal Quantity ** (Equivalent) |
|---|---|---|---|---|---|---|---|
| 1 | $C_4''$ - MAH $[\eta] = 0.65$ | 15.4 | 2.0 | — | $MgCl_2 \cdot 6H_2O$ | 20.3 | 1.0 |
| 2 | " | " | 8.0 | 100 : 0 | $CaCl_2$ | 11.1 | " |
| 3 | " | " | " | " | $MnSO_4 \cdot 7H_2O$ | 24.7 | " |
| 4 | " | " | " | " | $Al_2(SO_4)_3 \cdot 18H_2O$ | 33.5 | " |
| 5 | St - MAH $[\eta] = 0.70$ | 20.2 | " | " | $MgCl_2 \cdot 6H_2O$ | 20.3 | " |
| 6 | 1 - $C_6'$ - MAH $[\eta] = 0.20$ | 18.5 | " | " | " | " | " |

$C_4''$ : butadiene, MAH: maleic anhydride, St: styrene, 1 - $C_6'$: 1-hexene
* : See the corresponding explanation in the specification.
** : Equivalent number of metal in the added compound, provided that the amount of maleic anhydride residue in copolymer is taken to be unity.

EXAMPLE 8

15.2g. of a butadiene-maleic anhydride copolymer prepared by radical polymerization with an intrinsic viscosity of 0.70 (determined in acetone at 30° C.; the intrinsic viscosities in the following Examples 9–17 being also determined in this way) and with a butadiene/maleic anhydride composition ratio of 51 : 49, 20.2g. of triethylamine and 30 ml. of pure water were fed in a separable 500 ml. flask which was equipped with a reflux condenser and a stirrer and in which the air had been purged with nitrogen. Heating was then applied at 100° C. for 2 hours with stirring to give a colorless, transparent, viscous aqueous solution with a pH of 12. After cooling, the pH of the aqueous solution was brought down to 8 using an aqueous sulfuric acid solution. On the other hand, an aqueous magnesium chloride solution was prepared by dissolving 17.0g. of magnesium chloride hexahydrate in 50 ml. of pure water. The whole amount of the aqueous magnesium chloride solution was added to the above-mentioned aqueous copolymer amine salt solution over a period of 5 minutes. After completion of the addition, stirring was continued for another 10 minutes and the aqueous solution was then left standing for 2 hours. As a result, it was separated into a low viscosity upper layer and a high viscosity lower layer. After removal of the upper layer, part of the remaining transparent, viscous lower layer was withdrawn into a test tube, which was heated at 100° C. After 2 minutes, the heated aqueous solution was converted into a solid with a rubber-like strength and elasticity. The test tube was then cooled with flowing water, resulting in that the solid therein was slowly liquefied and after 5 minutes reverted to its original state of a transparent, viscous liquid. This reversible change occurred every time such heating and cooling operations were repeated. The composition of the liquid was as shown in Table 3.

EXAMPLE 8A

The liquid composition prepared in Example 8 was diluted to 8 times its amount by adding water. Heating was then applied with the result that at about 90° C. this liquid was converted into a white, jelly-like solid. When cooled, the solid was gradually liquefied until it finally reverted to the original liquid state. The composition of the liquid was a shown in Table 3.

EXAMPLE 9

An experiment was conducted in the same way as in Example 8 except that the amount of magnesium chloride hexahydrate added was reduced to 14.0g. In this case, however, the phenomenon of two layer separation did not occur even after completion of the addition of the aqueous magnesium chloride solution. Part of the aqueous solution was withdrawn and heated at 100° C. to find that it was converted into a soft, white, agar-like solid. The solid was then cooled with flowing water, resulting in that after 2 minutes it reverted to its original state of an aqueous solution. Such heating and cooling operations were repeated five times, but the same change occurred at every repetition.

EXAMPLE 10

An aqueous copolymer amine salt solution was prepared in the same way as in Example 8 except tha there were used 20.5g. of a 33% aqueous solution of dimethylamine in place of triethylamine, and 200 ml. of water. The pH of the aqueous copolymer amine salt solution was 9. On the other hand, an aqueous magnesium chloride solution was prepared by dissolving 20.3g. of magnesium chloride hexahydrate in 50 ml. of water. This aqueous solution was added little by little to the above-mentioned aqueous copolymer amine salt solution. After completion of the addition, the aqueous solution was transferred into a messcylinder, which was left standing for 2 hours. As a result, the solution was separated into two layers. From the lower layer which was a transparent, viscous aqueous solution, 10 ml. was withdrawn into a test tube and then heated, resulting in that at about 80° C. it began to assume a solid phase and at about 90° C. it became a strong, rubber-like solid. The solid was left standing at room temperature to find that after 1 hour it completely reverted to its original state of a transparent aqueous solution.

EXAMPLE 11

30g. of a butadiene-maleic anhydride copolymer with an intrinsic viscosity of 0.31 and with a butadiene/-maleic anhydride composition ratio of 50 : 50 polymerized using benzoyl peroxide as radical initiator and acetone as polymerization solvent, 22g. of a 28% aqueous ammonia and 300 ml. of water were fed in a separable 500 ml. flask equipped with a stirrer. Stirring was then applied for 4 hours at room temperature under a nitrogen gas stream to give a transparent, viscous aqueous solution with a pH of 10. The pH of the solution was brought down to 7.5 using an aqueous sulfuric acid solution. Thereafter, 44g. of magnesium sulfate hydrate as a solid was introduced and stirring was continued for another 1 hour. The resulting whitely turbid aqueous solution was transferred into a messcylinder, which was left standing. As a result, the solution was separated into two layers. After removal of the upper layer, part of the lower layer was withdrawn into a test tube, which was heated in an oil bath at 100° C. After 2 minutes, it was converted into a solid-like matter with a rubber-like strength and elasticity. After removal of heat by cooling, the solidlike matter reverted to its original state of an aqueous solution. The composition of the aqueous solution was as shown in Table 3.

EXAMPLE 11A 30g. of the same copolymer as in Example 11, 14.2g. of sodium hydroxide, 200 ml. of water and 32g. of magnesium acetate tetrahydrate were fed in the same apparatus as in Example 11, and stirring was then applied for 5 hours under a nitrogen gas stream to give a homogeneous liquid composition. Heating was then applied with the result that at about 90° C. the liquid was converted into a jelly-like solid, which on cooling reverted to its original liquid state. The composition of the liquid was as shown in Table 3. 20g. of the liquid was withdrawn and the bulk of the water was removed using a rotary evaporator. Drying was then applied under reduced pressure at 60° C. for 2 days to give a solid with vitreous appearance and hardness. The solid was pulverized and then water was added so that the total amount became 20g. They were introduced in an Erlenmeyer flask, which was shaken on a shaking machine for 2 hours to allow the powder to be dissolved in water. The resulting liquid was heated with the result that at 90° C. it became jelly-like solid, which on cooling reverted to the original liquid phase. The composition of the liquid was as shown in Table 3.

EXAMPLE 11B

A transparent aqueous solution was prepared in the same way as in Example 11 except that 3.3g. potassium hydroxide was used in place of aqueous ammonia and the amount of water used was 200 ml. To it was then added 38.6g. of magnesium acetate tetrahydrate to give a liquid composition, which on heating was not solidified. 50g. of an aqueous solution containing 19.0g. of potassium hydroxide was then introduced, and stirring was applied for 5 hours at room temperature. The solution which had been inhomogeneous after addition of the aqueous potassium hydroxide solution became homogeneous after the 5 hour stirring period. The homogeneous solution was heated with stirring, resulting in that lump-like solids were deposited. The solid precipitates were collected through hot filtration and then left standing for 2 hours at room temperature to find that they were converted into liquid. A gradual heating was then applied to the liquid with the result that at about 60° C. the liquid begqn to be solidified when 80° C. was reached it became a strong, rubber-like solid, which on cooling reverted to the original state of a viscous liquid. The composition of the liquid was as shown in Table 3.

EXAMPLE 11C

To the composition obtained in Example 11B was added 11.7g. of sodium chloride and a thorough stirring was then applied to allow the sodium chloride to be dissolved. The resulting liquid exhibited the same properties as those before addition of sodium chloride. Its composition was as shown in Table 3.

EXAMPLE 12

30g. of the same polymer as in Example 11, 30g. of triethylamine, 4g. of sodium hydroxide and 300 ml. of water were fed in a separable flask equipped with a stirrer and a reflux condenser. Stirring was then applied for 2 hours at 80° C. under a nitrogen gas stream to give a transparent, viscous aqueous solution with a pH of about 10. After cooling to room temperature, the pH of the aqueous solution was brought down to 7.5 using an aqueous sulfuric acid solution. Thereafter, a separately prepared aqueous solution comprising 44g. of magnesium sulfate heptahydrate and 200cc of water was introduced at a time, with stirring continued for another 10 minutes. The resulting whitely turbid aqueous solution was transferred into a separating funnel, which was left standing to allow the solution to be separated into two layers. From the lower layer, 100cc was withdrawn into a test tube, which was heated on a burner. As a result, the solution was converted into a rubber-like solid in a short time. The solid on cooling reverted to its original state of an aqueous solution.

EXAMPLE 13

An experiment was conducted in the same way as in Example 11 except that the amount of magnesium sulfate added was 30g. The resulting aqueous solution was more transparent than that in Example 11, but the layer separation did not occur even after the solution had been left standing for 6 hours. Part of the solution was withdrawn into a test tube and then heated, resulting in that at about 80° C. it was converted into a white, agar-like matter. Upon cooling with flowing water, this agar-like matter reverted to its original state of an aqueous solution. This reversible change could be repeated with good reproducibility.

EXAMPLE 14

50 ml. of the aqueous butadiene-maleic acid copolymer magnesium slat solution prepared in Example 11 was withdrawn and water was removed therefrom using a rotary evaporator. The resulting white, hard, brittle solid was dissolved in 50 ml. of water and the resulting aqueous solution was heated at 100° C. As a result, it was converted into a rubber-like matter, which on cooling reverted to its original state of an aqueous solution.

EXAMPLE 15

30g. of the same butadiene-maleic anhydride copolymer as in Example 11, 40g. of cyclohexylamine and 500 ml. of water were fed in a separable 1 liter flask equipped with a stirrer and a reflux condenser. A reaction was carried out for 1 hour at 100° C. under a nitrogen gas atmosphere to give a transparent, viscous, aqueous butadiene-maleic acid copolymer cyclohexylamine salt solution. To this aqueous solution was added over a period of 10 minutes a separately prepared aqueous solution of 56g. of magnesium acetate tetrahydrate in 100 ml. of water. After completion of the addition, heating was applied up to near 100° C. while a violent stirring was applied to the interior pf the flask, resulting in that there were deposited many solids in the form of small lumps. The solids were separated from the liquid phase by means of hot filtration and collected in a flask. Cooling of the flask in an ice-water bath resulted in that after 5 minutes the solids therein were completely converted into an aqueous solution. To the aqueous solution thus obtained there were repeatedly applied such heating and cooling operations. At every repetition the aqueous solution on heating was converted into a rubber-like matter and on cooling reverted to its original liquid phase.

EXAMPLE 16

15.2g. of a butadiene-maleic anhydride copolymer with an instrinsic viscosity of 1.02 and with a butadiene/maleic anhydride composition ratio of 51 : 49 obtained by polymerization at room temperature through γ-ray irradiation using cobalt 60 as the γ-ray source and cyclohexanone as solvent, 18.7g. pyridine and 200 ml. of water were fed in a separable 500 ml. flask equipped with a stirrer and a reflux condenser. A reaction was carried out for 1 hour at 100° C. under a nitrogen gas stream to give a transparent, homogeneous aqueous solution with a pH of 13. To the aqueous solution was then added, over a period of 5 minutes, the whole amount of a separately prepared aqueous solution of 38.6g. of magnesium acetate tetrahydrate in 100 ml. of water. After completion of the addition, the resulting aqueous solution was separated into two layers. Removal of the upper water layer left a viscous aqueous solution of the lower layer. This aqueous solution on heating began to solidify at about 80° C. and increased in strength at temperatures about 90° C. Upon cooling, it reverted to its original state of an aqueous solution.

EXAMPLE 17

10 ml. of the aqueous butadiene-maleic acid copolymer magnesium salt solution obtained in Example 15 was diluted with 100 ml. of water. The diluted aqueous solution was dropped little by little into 1 liter of violently stirred methanol. The resulting precipitates were collected and then dried for 10 hours. Thereafter, they were pulverized and then vacuum dried for 30 hours. 1g. of the powder thereby obtained was dissolved in 5 ml. of water. The resulting aqueous solution assumed a solid phase at high temperatures and a liquid phase at low temperatures. The transition between the two phases was reversible.

COMPARATIVE EXAMPLES 7-12

Experiments were conducted in the same way as in Example 8 but using the conditions set out in Table 2. In Comparative Example 7, the pH of this aqueous solution was about 4. That is, the production condition of the present invention was not satisfied, and hence the novel substance as aimed at by the present invention could not be obtained.

In Comparative Examples 8-12, calcium, barium, aluminum, iron and nickel were substituted for magnesium. In all the cases, the metal ions immediately reacted with the copolymer.amine salt in the aqueous solution to produce precipitates. In all the experiments using such metals, it was impossible to produce a substance which on heating assumes a solid phase and on cooling is converted into an aqueous solution and which undergoes a reversible transition between the two phases.

Table 2

| Comparative Example | Starting Copolymer Kind | Qty. (g.) | Amine Kind | Qty. (g.) | p : q * | Metallic Compounds Added Kind | Qty. (g.) | Metal Quantity ** (Equivalent) |
|---|---|---|---|---|---|---|---|---|
| 7 | $C_4''$ - MAH $[\eta]$ =0.70 | 15.2 | triethylamine | 5.0 | — | $MgCl_2 \cdot 6H_2O$ | 20.3 | 1.0 |
| 8 | " | " | " | 20.2 | 100 : 0 | $CaCl_2$ | 11.1 | " |
| 9 | " | " | ammonia | 3.4 | " | $BaCl_2 \cdot 2H_2O$ | 24.4 | " |
| 10 | $C_4''$ - MAH $[\eta]$ = 1.02 | 15.0 | " | " | " | $Al_2(SO_4)_3 \cdot 18H_2O$ | 33.5 | " |
| 11 | " | " | diethylamine | 14.6 | " | $FeCl_3 \cdot 6H_2O$ | 27.0 | " |
| 12 | " | " | " | " | " | $Ni(C_2H_3O_2)_2 \cdot 4H_2O$ | 24.9 | " |

$C_4''$ : butadiene MAH : maleic anhydride
\* : See the corresponding explanation in the specification.
\*\* : Equivalent number of metal in the added metallic compound, provided that the amount of maleic anhydride residue in copolymer is taken to be unity.

EXAMPLE 18

68g. of isoprene, 98g. of maleic anhydride, 2.4g. of benzoyl peroxide and 500 ml. of cyclohexanone were fed in a 1 liter autoclave and a reaction conducted for 2 hours at 80° C. under a nitrogen atmosphere. The resulting polymerized solution was introduced in 5 liter of benzene to allow the copolymer to be deposited. The resulting precipitates were collected through filtration, washed with benzene several times and dried under reduced pressure for 40 hours. The dried copolymer was of a white color and had an intrinsic viscosity of 0.62 (determined in dimethylformamide at 30° C.). Its yield was 41% (68g.). 20g. of this copolymer, 9.6g. of sodium hydroxide and 300 ml. of water were fed in a separable 500 ml. flask equipped with a cooler and a stirrer. Heating was then applied for 1 hour at 100° C. with stirring and under a nitrogen atmosphere to give a homogeneous aqueous solution with a pH of 12. After cooling to room temperature, the pH of the solution was brought down to 8 using an aqueous sulfuric acid solution. To the aqueous solution was slowly added a four-fifths amount of a separately prepared aqueous solution consisting of 22g. of magnesium chloride hexahydrate and 100cc. of water. After completion of the addition, part of the aqueous solution was withdrawn and heated at 90° C. to find that it was converted into a white, agar-like solid, which on cooling reverted to its original state of an aqueous solution. Addition of the remaining one-fifth amount of the aqueous magnesium chloride solution in the aqueous polymer solution resulted in that the aqueous solution became whitely turbid and in that after left standing for 2 hours it was separated into two liquid-phase layers. After removal of the upper layer, part of a viscous lower layer was withdrawn and heated at 90° C. to find that it was converted into a solid with a rubber-like elasticity. The solid on cooling reverted to its original state of an aqueous solution.

The composition of the jelly-like composition and that of the rubber-like composition both on heating were as shown in Table 3.

EXAMPLE 19

An aqueous copolymer.amine salt solution was prepared in the same way as in Example 18 except that 19g. of triethylamine was used in place of sodium hydroxide. The pH of the aqueous solution was about 10. To the solution was slowly added a separately prepared aqueous solution consisting of 24g. of magnesium chloride hexahydrate and 100 ml. of water. Just before completion of the addition of the aqueous magnesium chloride solution, the aqueous copolymer.amine salt solution began to become turbid, and after completion of the addition and after left standing overnight the aqueous solution was separated into two layers. The lower layer was withdrawn and heated at 100° C. to give a rubber-like solid, which on cooling again to room temperature reverted to its original state of a viscous aqueous solution. The composition of the aqueous solution was as shown in Table 3.

EXAMPLE 20

An aqueous copolymer.salt solution was prepared in the same way as in Example 18 except that 7.8g. of potassium hydroxide was used in place of sodium hydroxide and the amount of water used was 500 ml. To it was added, over a one hour period, a separately prepared aqueous solution consisting of 35g. of magnesium sulfate heptahydrate and 200 ml. of water. After completion of the addition, the aqueous solution was left standing overnight to find that the aqueous solution was separated into a large amount of the upper layer and a small amount of the lower layer. The lower layer was withdrawn and heated at 100° C. to give a rubber-like solid. The solid was cooled again to room temperature with the result that it reverted to its original state of an aqueous solution.

EXAMPLE 21

89g. of chloroprene, 98g. of maleic anhydride, 1.6g. of azobisisobutyronitrile and 500 ml. of dioxane were fed in a 1liter autoclave and a polymerization conducted for 2 hours at 80° C. under a nitrogen atmosphere. The resulting viscous, polymerized solution was introduced in 5 liter of benzene to allow the copolymer to be deposited. The resulting precipitates were collected, washed with benzene and dried under reduced pressure. The purified chloroprenemaleic anhydride copolymer, which was a light yellow solid, had an intrinsic viscosity of 0.52 determined in dimethylformamide at 30° C. Its yield was 55% (103g.) 20g. of the copolymer, 19g. of sodium carbonate and 300ml. of water were fed in a 500 ml. Erlenmeyer flask, which was shaked on a shaking machine for 5 hours at room temperature to give a homogeneous aqueous solution with a pH of 10. To the aqueous solution was added 16g. of a solid magnesium chloride hexahydrate and a further shaking was applied for 2 hours, and then the aqueous solution was left standing. After the solution had been completely separated into two layers, the upper water layer was removed. The remaining transparent, viscous aqueous solution of the lower layer presented a reversible cross-linking phenomenon such that when heated it was converted into a rubber-like solid and when cooled it reverted to the original state of an aqueous solution.

EXAMPLE 22

19g. of the chloroprene-maleic anhydride copolymer prepared in Example 21, 15g. of n-butylamine and 300 ml. of water were fed in a separable 500 ml. flask equipped with a cooler and a stirrer, and a reaction conducted for 2 hours at 80° C. to give an aqueous copolymer.amine salt solution. After the aqueous solution had been cooled to room temperature, the pH of the solution was brought down to 8 by adding an aqueous sulfuric acid solution. To the aqueous copolymer.amine salt solution thus pH adjusted was then added, little by little with stirring, a separately prepared aqueous solution of 32g. of magnesium acetate tetrahydrate in 200 cc of water. After completion of the addition, the temperature of the solution was raised to 90° C. with violent stirring, resulting in that there were formed in the solution small lump-like precipitates. The precipitates were separated through hot filtration and then placed in a beaker, which was cooled with flowing water. As a result, the precipitates were liquefied into a viscous aqueous solution, which on heating reverted to its original state of solid with a rubber-like elasticity.

EXAMPLE 23

From 100 ml. of the aqueous solution obtained in Example 22 which on heating is solidified and on cooling is liquefied, water was removed using a rotary evaporator. The resulting solid matter was dried for 20 hours under reduced pressure at 100° C. to give a chloroprene-maleic acid magnesium salt which was hard and brittle. The latter was pulverized in a ball mill, and thereafter 1g. was taken out into a test tube and then redissolved in 10 ml. of water. The test tube was placee in an oil bath held at 100° C. and left standing for 5 minutes to find that the interior of the test tube was converted into a rubber-like solid. The test tube was then taken out of the oil bath and cooled with flowing water, resulting in that the interior thereof reverted to its original state of an aqueous solution. This phase transition between such heating and cooling operations could be repeated with good reproducibility.

EXAMPLE 24

68g. of piperylene, 98g. of maleic anhydride, 1.6g. of azobisisobutyronitrile and 500 ml of cyclohexanone were fed in a 1 liter autoclave and a polymerization conducted for 2 hours at 80° C. under a nitrogen atmosphere. The resulting viscous polymerized solution was introduced in 5 liter of toluene to allow the copolymer to be deposited. The precipitates were collected by means of filtration, washed with toluene several times and dried under reduced pressure. As a result, there was obtained a purified piperylene-maleic anhydride copolymer in 35% (59g.) yield, which had an intrinsic viscosity of 0.42 determined in dimethylformamide at 30° C. 20g. of the copolymer, 13.5g. of potassium hydroxide and 400 ml. of water were fed in a separable 1 liter flask equipped with a cooler and a stirrer, and stirring was then applied for 1 hour at 100° C. under a nitrogen gas stream, to give a homogeneous aqueous solution with a pH of 12. A half amount of the aqueous solution was withdrawn into an Erlenmeyer flask and the pH thereof was brought down to 7.5 using an aqueous sulfuric acid solution. To the other aqueous solution without pH adjustment was added, little by little with continued stirring, a separately prepared aqueous solution consisting of 11g. of magnesium chloride hexahydrate and 200 ml. of water. To the pH adjusted one was added at a time 11g. of a solid magnesium choride hexahydrate and stirring was applied for 1 hour. After these operations, both aqueous solutions became whitely turbid and therefore they were left standing for 2 hours at room temperature. As a result, both were each separated into two liquid layers. Removal of the respective upper layers left viscous aqueous solutions of the respective lower layers, which on heating were converted into rubber-like solids and on cooling reverted to their original states of aqueous solutions.

EXAMPLE 25

68g. of isoprene, 130g. of citraconic anhydride, 1.6g. of azobisisobutyronitrile and 500 ml. of cyclohexanone were fed in a 1 liter autoclave and a polymerication conducted for 2 hours at 70° C. under a nitrogen atmosphere, followed by application of the same procedure as in Example 24, to give a purified copolymer in 42% (83g.) hield. Using 20g. of the copolymer, 7.2g. of sodium hydroxide and 300 ml. of water, an aqueous isoprene-citraconic acid copolymer sodium salt solution was prepared. To the aqueous solution was added an aqueous magnesium acetate solution comprising 22g. of magnesium acetate and 100 ml. of water and stirring was applied for 30 minutes. After completion of the addition, the aqueous solution was left standing overnight to allow it to be separated into two layers. The lower layer of a viscous polymer solution was separated and then heated with direct fire, resulting in that immediately it began to be solidified and after 3 minutes the whole was converted into a rubber-like solid. The solid was then cooled in an iced water with the result that it reverted to the original state of an aqueous solution. The kinematic viscosity of this aqueous solution at 30° C. was 200 cp. The transition between these two phases could be repeated with good reproducibility.

Composition of the compositions obtained in Examples:

Table 3

| Composition Example | A p : q | Maleic acid unit | B Equiv. | C Equiv. | D Equiv. | E E/(A+B+C+D) wt. ratio |
|---|---|---|---|---|---|---|
| 1 | 100 : 0 | 1 | 2.0 | 0.70 | 1.4 | 12 |
| 2 | 100 : 0 | 1 | 1.0 | 0.90 | 0.75 | 6 |
| 3 | 100 : 67 | 1 | 0.9 | 1.1 | 1.5 | 7 |
| 8 | 100 : 25 | 1 | 1.2 | 0.82 | 0.90 | 6 |
| 8A | 100 : 67 | 1 | 0.9 | 1.0 | 1.5 | 50 |
| 11 | 100 : 25 | 1 | 1.3 | 0.85 | 0.60 | 5 |
| 11A | 100 : 25 | 1 | 1.8 | 0.75 | 1.5 | 3 |
| 11B | 100 : 0 | 1 | 1.0 | 0.85 | 0.7 | 4 |
| 11C | 100 : 0 | 1 | 1.2 | 0.85 | 0.9 | 3 |
|  | jelly-like | 1 | 2.0 | 0.72 | 1.4 | 10 |
| 18 | rubber-like | 1 | 0.85 | 0.85 | 0.80 | 4 |
| 19 | 100 : 67 | 1 | 1.3 | 0.90 | 0.7 | 6 |

I claim:

1. Novel liquid compositions comprising (A) high-molecular anions from dissociation of a part or the whole of the carboxylic acid group of a conjugated diene-maleic acid derivative copolymer with repeating units represented by the formulae

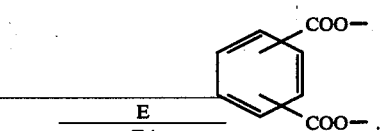

wherein R represents a conjugated diene unit in the copolymer, R' and R" each represent hydrogen or an organic radical having from 1 to 18 carbon atoms and p and q each are an integer, the degree of dissociation in terms of p : q being in the range from 100 : 0 to 0 : 100, B. one or more of alkali metal cations selected from $Na^+$, $K^+$ and $Li^+$ or quaternary ammonium cations represented by $R_1R_2N^+R_3R_4$ wherein $R_1$, $R_2$, $R_3$ and $R_4$ are the same or different and each selected from the group consisting of hydrogen, alkyl radical of from 1 to 18 carbon atoms, cycloalkyl radical and aryl radical, the amount being in the range from 0.5 to 5.0 equivalents, on the basis of the maleic acid derivative unit in the component (A);

C. $Mg^{2+}$ ions in an amount from 0.5 to 2.0 equivalents, on the basis of the maleic acid derivative unit in the component (A);

D. anions of magnesium compound(s) or alkali metal compound(s), the amount being in the range from 0.5 to 7.0 equivalents, on the basis of the maleic acid derivative unit in the component (A); and E. water in an amount in the range from 1 to 1000 times, the total weight of the componets (A), (B), (C) and (D), said composition being reversibly liquid at lower temperatures and solid at higher temperatures.

2. Compositions according to claim 1 wherein the conjugated diene unit in the component (A) is butadiene, isoprene, chloroprene, 2,3-dimethylbutadiene, 2,3-dichlorobutadiene, piperilene, 2-methyl-1,3-hexadiene, 2,4-hexadiene or 1-methoxy-1,3-butadiene.

3. Compositions according to claim 1 wherein the maleic acid derivative unit in the component (A) is maleic acid or citraconic acid.

4. Compositions according to claim 1 wherein the component (D) is $Cl^-$, $Br^-$, $SO_4^{--}$, $MnO_4^-$, $NO_3^-$, $ClO_4^-$, $HCOO^-$, $CH_3COO^-$, $CH_3CH_2COO^-$ or

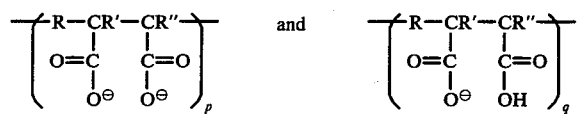

5. Process for preparing the composition according to claim 1 which comprises reacting a conjugated diene-maleic acid derivative copolymer with a base or bases in an amount in the range from 1 to 2 moles per mole of the maleic acid derivative unit in water to give an aqueous solution at pH from 7 to 14, and adding to the resulting aqueous solution water-soluble magnesium compound(s) in an amount from 0.5 to 2.0 moles, per mole of the maleic acid derivative unit.

6. Process according to claim 5 wherein the base is one or more members of the group consisting of alkali metal hydroxides, carbonates and bicarbonates and ammonia, primary, secondary and tertiary amines.

7. Process according to claim 5 wherein the magnesium compound is magnesium chloride, sulfate, nitrate, formate, acetate, propionate or phthalates.

8. Process according to claim 5 wherein the conjugated diene is butadiene, isoprene, chloroprene, piperilene, 2,3-dimethylbutadiene, 2,3-dichlorobutadiene, 2-methyl-1,3-hexadiene, 2,4-hexadiene or 1-methoxy-1,3-butadiene.

9. Process for preparing the compositions according to claim 1 wherein a conjugated diene-maleic acid derivative copolymer in water is mixed simultaneously with a base or bases in an amount from 1 to 2 moles per mole of the maleic acid derivative unit and water-soluble magnesium compound(s) in an amount from 0.5 to 2.0, per mole of the maleic acid derivative unit to give a homogeneous solution.

10. Process according to claim 9 wherein the base is one or more members of the group consisting of alkali metal hydroxides, carbonates and bicarbonates and ammonia, primary, secondary and tertiary amines.

11. Process according to claim 9 wherein the magnesium compound is magnesium chloride, sulfate, nitrate, formate, acetate, propionate or phthalates.

12. Process according to claim 9 wherein the conjugated diene is butadiene, isoprene, chloroprene, piperilene, 2,3-dimethylbutadiene, 2,3-dichlorobutadiene, 2-methyl-1,3-hexadiene, 2,4-hexadiene or 1-methoxy-1,3-butadiene.

13. Process for preparing the compositions according to claim 1 which comprises reacting a conjugated diene-maleic acid derivative copolymer and a base or bases in water to prepare an aqueous solution at pH 7 or below, adding to the resulting aqueous solution water-soluble magnesium compound(s) in an amount from 0.5 to 2.0 moles, per mole of the maleic acid derivative unit and further adding the base finally to a total amount of the base from 1 to 2 moles per mole of the maleic acid derivative unit.

14. Process according to claim 13 wherein the base is one or more members of the group consisting of alkali metal hydroxides, carbonate and bicarbonates and ammonia, primary, secondary and tertiary amines.

15. Process according to claim 13 wherein the magnesium compound is magnesium chloride, sulfate, nitrate, formate, acetate, propionate or phthalates.

16. Process according to claim 13 wherein the conjugated diene is butadiene, isoprene, chloroprene, piperilene, 2,3-dimethylbutadiene, 2,3-dichlorobutadiene, 2-methyl-1,3-hexadiene, 2,4-hexadiene or 1-methoxy-1,3-butadiene.

* * * * *

UNITED STATES PATENT AND TRADEMARK OFFICE
CERTIFICATE OF CORRECTION

PATENT NO. : 4,072,646

DATED : February 7, 1978

INVENTOR(S) : Ito, et al.

It is certified that error appears in the above-identified patent and that said Letters Patent are hereby corrected as shown below:

Under [30] Foreign Application Priority Data:
Add:

Oct. 23, 1974 Japan  49-121522
July 23, 1975 Japan  50-89184
Sept. 17, 1975 Japan 50-111775

Signed and Sealed this

First Day of August 1978

[SEAL]

Attest:

RUTH C. MASON
Attesting Officer

DONALD W. BANNER
Commissioner of Patents and Trademarks